US009495089B2

(12) United States Patent
Jeong et al.

(10) Patent No.: US 9,495,089 B2
(45) Date of Patent: *Nov. 15, 2016

(54) MOBILE COMMUNICATION TERMINAL AND CONTROL METHOD THEREOF

(71) Applicant: LG ELECTRONICS INC., Seoul (KR)

(72) Inventors: Hoe Kyung Jeong, Kunpo-si (KR); Jun Hyun Yoo, Anyang-si (KR); Han Na Lee, Ansan-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/043,155

(22) Filed: Oct. 1, 2013

(65) Prior Publication Data

US 2014/0089844 A1    Mar. 27, 2014

Related U.S. Application Data

(63) Continuation of application No. 11/495,747, filed on Jul. 31, 2006, now Pat. No. 8,600,444.

(30) Foreign Application Priority Data

Jul. 30, 2005  (KR) .................. 10-2005-0070014
Jan. 12, 2006  (KR) .................. 10-2006-0003590

(51) Int. Cl.
*H04W 4/00*      (2009.01)
*G06F 3/0485*    (2013.01)
(Continued)

(52) U.S. Cl.
CPC .......... *G06F 3/0485* (2013.01); *G06F 3/0482* (2013.01); *H04M 1/72522* (2013.01); *H04M 1/72583* (2013.01); *G06F 2203/04803* (2013.01); *H04M 1/72544* (2013.01)

(58) Field of Classification Search
CPC ............ G06F 3/14; G06F 3/00; G06F 15/02; H04M 1/00
See application file for complete search history.

(56) References Cited

U.S. PATENT DOCUMENTS 5,301,348 A * 4/1994 Jaaskelainen ............... 714/46
6,038,588 A    3/2000 Nagarajayya et al.
(Continued)

FOREIGN PATENT DOCUMENTS

EP   1 631 046 A1   3/2006
JP   2004-062369 A  2/2004
(Continued)

OTHER PUBLICATIONS

News Article. "SmallMenuPlus: Add a Task Manager to the Start Menu of a Pocket PC", http://www.forest.impress.co.jp/article/2002/03/07/smallmenu.html, Mar. 7, 2002.

*Primary Examiner* — Shantell L Heiber
(74) *Attorney, Agent, or Firm* — Birch, Stewart, Kolasch & Birch, LLP

(57) ABSTRACT

A mobile communication terminal including a display unit; a controller configured to display, on a screen of the display unit, a first list including a plurality of tasks; and an input unit configured to select at least one of the plurality of tasks. The controller is further configured to visually and discriminately divide the screen, display information corresponding to a task selected, display a second list including icons corresponding to tasks that are being currently executed, display progress state information indicating a progress state of the currently executing tasks on the bottom screen, and update the second list based on a detection result of the tasks being currently executed, and scroll through the icons listed in the second list so as to display other icons not being displayed in the bottom screen when a scroll signal indicating a scroll of the second list is received from the input unit.

20 Claims, 6 Drawing Sheets

(51) Int. Cl.
*G06F 3/0482* (2013.01)
*H04M 1/725* (2006.01)

(56) References Cited

U.S. PATENT DOCUMENTS

| | | | |
|---|---|---|---|
| 6,097,390 A * | 8/2000 | Marks | 715/772 |
| 6,239,801 B1 * | 5/2001 | Chiu et al. | 715/203 |
| 6,957,395 B1 | 10/2005 | Jobs et al. | |
| 7,222,304 B2 * | 5/2007 | Beaton et al. | 715/744 |
| 2003/0013483 A1 | 1/2003 | Ausems et al. | |
| 2003/0119562 A1 * | 6/2003 | Kokubo | 455/566 |
| 2005/0009571 A1 | 1/2005 | Chiam et al. | |
| 2005/0159832 A1 * | 7/2005 | Umeo | G08C 19/00 700/94 |
| 2007/0016434 A1 * | 1/2007 | Oppenheimer et al. | 705/1 |
| 2007/0211172 A1 | 9/2007 | Kondo et al. | |

FOREIGN PATENT DOCUMENTS

| | | |
|---|---|---|
| JP | 2005-122535 A | 5/2005 |
| WO | WO 2004/044727 A1 | 5/2004 |

\* cited by examiner

MOBILE COMMUNICATION TERMINAL AND CONTROL METHOD THEREOF

The present application is a Continuation of copending application Ser. No. 11/495,747 filed on Jul. 31, 2006, which claims priority to Korea Patent Applications No. 10-2005-0070014 filed on Jul. 30, 2005, and 10-2006-0003590 filed on Jan. 12, 2006, the entire contents of which are incorporated by reference in their entirety.

BACKGROUND OF THE INVENTION

Field of the Invention

The present invention relates to a mobile communication terminal and method thereof.

Discussion of the Related Art

Mobile communication terminals provide a variety of additional functions other than the basic communication functions. The additional functions can also be executed at the same time, which is referred to as multi-tasking. For example, a user can send a message to another user while simultaneously listening to music. The user can also download data while simultaneously playing a game.

In addition, the user can also display a task menu including a list of tasks. However, the task menu is displayed as a single menu and when the user selects one of the tasks in the task menu, the information related to the selected task is displayed as a single screen, and the task menu is no longer displayed. Accordingly, to perform a multi-tasking operation, the user must first confirm that a task is currently executing, display the task menu, and then select another task to be executed from the displayed task menu. Further, the user is unable to confirm how the particular task is progressing.

Therefore, the related art mobile communication terminal is problematic because it is difficult to perform multiple tasks simultaneously. In addition, because mobile terminal resources have to be released or allocated to display the different screens such as a task menu and a task list, resources are unnecessarily wasted.

SUMMARY OF THE INVENTION

Accordingly, one object of the present invention is to address the above-noted and other problems with the related art.

Another object of the present invention is to simultaneously display both a list of tasks that can be simultaneously executed and a list of currently executing tasks.

Yet another object of the present invention is to display information informing the user on how a particular task or tasks are progressing.

To achieve these and other objects, the present invention provides in one aspect a mobile communication terminal including a display unit, and a controller configured to display on the display unit both a first list including tasks that can be simultaneously executed and a second list listing currently executing tasks.

In another aspect, the present invention provides a mobile communication method, which includes displaying both a first list including tasks that can be simultaneously executed and a second list listing currently executing tasks.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

A more compete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Reference will now be made in detail to the preferred embodiments of the present invention, examples of which are illustrated in the accompanying drawings.

Figure 1:
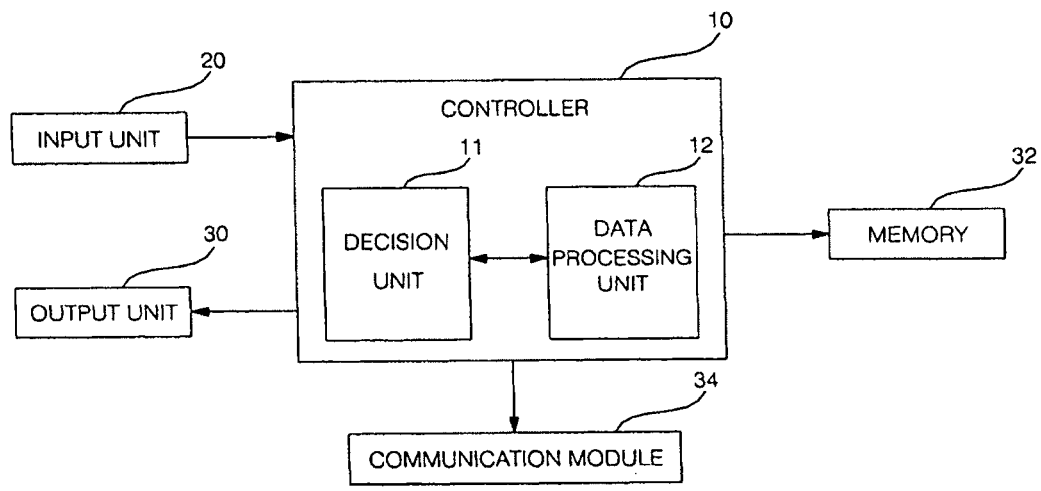
FIG. 1 is a block diagram of a mobile communication terminal according to an embodiment of the present invention.

Turning first to FIG. 1, which is a block diagram of a mobile communication terminal according to an embodiment of the present invention. As shown, the mobile terminal according includes a controller 10, an input unit 20, an output unit 30, a memory 32, and a communication module 34.

The input unit 20 also includes a plurality of number/character, functional, and move buttons (not shown) that the user presses or touches to enter commands or data, for example. The output unit 30 includes a display such as a Liquid Crystal Display (LCD) that is used to display a variety of menus, a status of the terminal, etc. In addition, the memory 32 stores programs or data for operating the terminal, data for configuring a screen necessary for the operation, and so on. Further, the communication module 34 provides an interface for communication through a mobile communication network. The controller 10 controls an individual operation of each element and controls an overall operation of the terminal.

As will be described in more detail later, the controller 10 controls an operation of the terminal such that a task menu including tasks that can be simultaneously executed and a list of currently executing tasks are both displayed on the output unit 30. That is, the controller 10 divides the screen of the output unit 30 so as to display the task menu and the list of currently executing tasks. Progress status information about a selected task can also be displayed on the output unit 30. The task menu and task list may be displayed at different portions of the terminal (e.g., on a main display and a secondary display) or may be displayed together on a single display.

Further, the progress status information includes, for example, a type of the selected task, how the task is progressing including a percentage or ratio of how much of the task has been completed, etc. Also, the input unit 20 includes up, down, right and left move buttons for scrolling through menus displayed on the output unit 30. Accordingly, a user can scroll through the displayed task menu, task list, etc, using these buttons. The user can also select items using one of the buttons of the input unit 20. In addition, when a first key or button is selected an item in the task menu is highlighted and when a second key or button is selected, an item in the task list is highlighted. Thus, using the keys on the input unit 20, the user can toggle between the task menu and the task list.

As discussed above, the controller 10 displays both a task menu and a task list on the output unit 30. The controller 10 also activates items that are selected from the task menu or the task list. Thus, as shown in FIG. 1, the controller 10 includes a decision unit 11 and a data processing unit 12. In more detail, the decision unit 11 determines which tasks are currently executing and the data processing unit 12 updates a task list based on the determination of the decision unit 11. The controller 10 then displays a list of tasks that are currently executing together with the task menu. The data processing unit 12 also divides the screen of the output unit 30 horizontal or vertically according to an input ratio and controls the task menu and the task list to be displayed on the divided screens.

For example, when the screen of the output unit 30 is divided into two horizontal screens, the data processing unit 12 displays the task menu on the top screen and displays the task list on the bottom screen. Similarly, when the screen is divided into two vertical screens, the data processing unit 12 displays the task menu on the left screen and displays the task list on the right screen. In addition, the decision unit 11 determines whether the up, down, right and left move buttons on the input unit 20 have been selected.

In addition, the data processing unit 12 also outputs the task menu and the task list to the output unit 30. Further, the data processing unit 12 controls a cursor or indicator allowing a user to scroll through the task menu or the task list and to toggle between the task menu and the task list based on selected buttons on the input unit 20. In other words, the data processing unit 12 may control the task menu to be listed vertically and icons of the task list to be listed horizontally.

Thus, if the up and down move buttons are selected, the data processing unit 12 scrolls though the task menu. Similarly, when the right and left move buttons are pressed, the data processing unit 12 scrolls through the task list. The user may also press an up or down button, for example, to move the cursor or indicators into the task menu and press the left or right button to move cursor or indicator into the task list. Thus, the user can toggle between the task menu and the task list using a single key operation.

For example, when the task menu displays the tasks "TELEPHONE DIRECTORY", "GAME", "MOTION PICTURE", "CAMERA", "MESSAGE", "INTERNET", "MUSIC" vertically on the screen of the output unit 30 and displays the currently executing tasks "GAME", "MESSAGE", "INTERNET", and "MUSIC" as icons horizontally in the task list on the screen of the output unit 30, the up and down move buttons can be used to scroll through the task menu and the right and left move buttons can be used to scroll through the task list.

Further, if an icon displayed on the task list is selected, the data processing unit 12 additionally displays a name of the selected icon so that the user can easily see the operational function of the selected icon. Also, when an icon is selected, the data processing unit 12 activates the function for the selected icon. For example, if the icon "GAME" is selected, the data processing unit 12 displays the appropriate menu for the "GAME" feature on the output unit 30.

Turning next to FIGS. 2 to 5, which are overviews of task menus and task lists both being displayed according to the present invention. Progress status information is also displayed in FIGS. 4 and 6.

Figure 2:
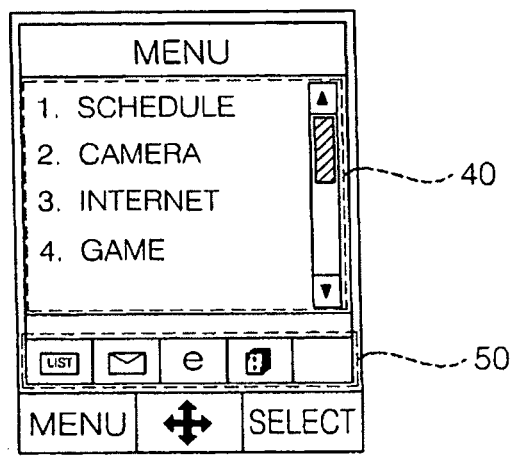
FIG. 2 is an overview illustrating displayed task menus and task lists according to a first embodiment of the present invention.

In more detail, as shown in FIG. 2, the screen of the output unit 30 is divided into top and bottom screens. Further, a task menu 40 including the tasks: "1. SCHEDULE," "2. CAMERA," "3. INTERNET," and "4. GAME" are displayed on the top screen, and a task list 50 including the currently executing tasks "MESSAGE," "INTERNET," and "GAME" are displayed as icons on the bottom screen. Thus, with reference to FIG. 3(*a*), when the non-executing task "CAMERA" 51 is selected on the task menu 40, an icon 52 corresponding to the selected task "CAMERA" 51 is added to the task list 50.

Figure 3A:
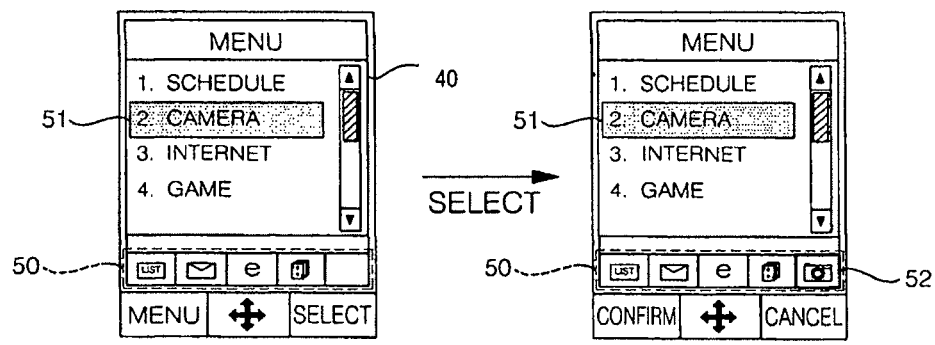
FIGS. 3(a)-3(c) are overviews illustrating displayed task menus and task lists according to the first embodiment.
Figure 3B:
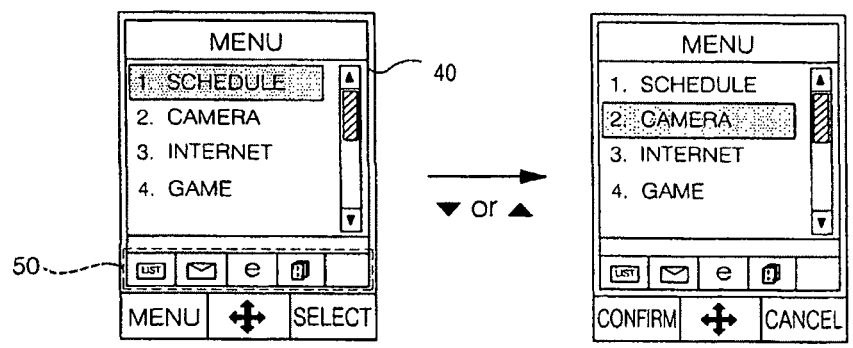
Figure 3C:
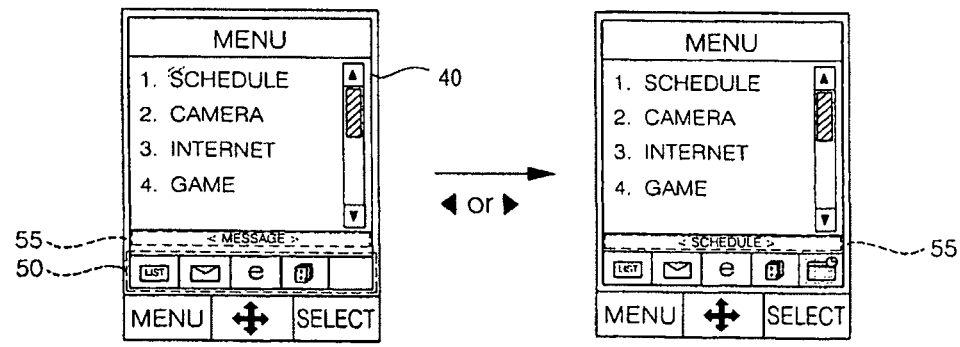
Figure 4A:
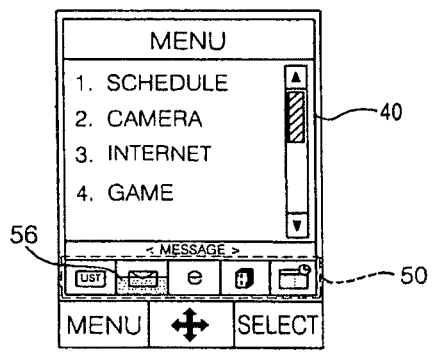
FIGS. 4(a)-4(d) are overviews illustrating displayed task menus and task lists according to the first embodiment.
Figure 4B:
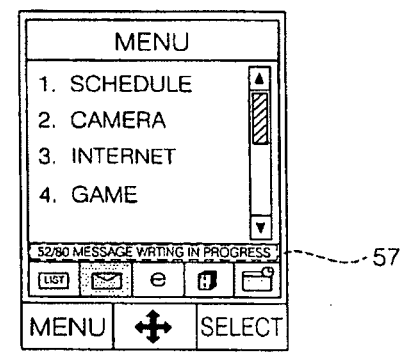
Figure 4C:
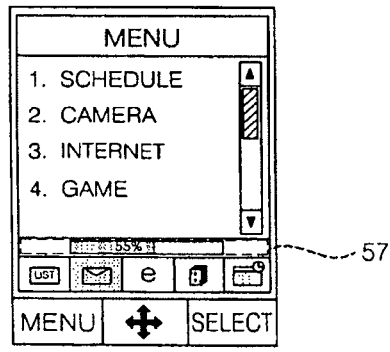
Figure 4D:
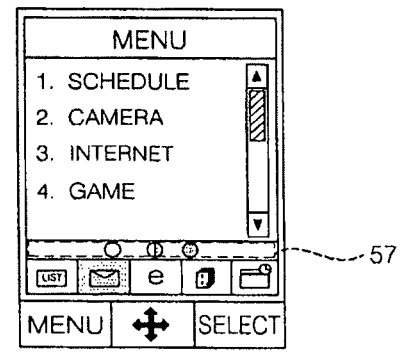

Furthermore, as shown in FIGS. 3(*b*) and 3(*c*), the up and down (▲▼) move buttons provided in the input unit 20 can be used to scroll through the task menu 40 and right and left (◄►) move buttons can be used to scroll through the task list 50. Also, as discussed above, if the cursor or indicator is in the task menu 40 (i.e., the task menu 40 is highlighted), the user can toggle to the task list 50 (i.e., the task list 50 is highlighted) by pressing the right or left move buttons. In addition, as shown in FIG. 3(*c*), when the message or schedule icon in the task list 50 is selected, the appropriate icon name 55 is also displayed. Thus, the user can confirm the operation function of the selected icon.

In addition, as discussed above and with reference to FIG. 4, progress status information about a task selected from the task list 50 can also be displayed. Further, the progress state information may be displayed at the top or bottom of the task list 50, or may be displayed as the particular icon variably changing based on the proceeding state information. In more detail, FIG. 4(*a*) illustrates the background of an email icon 56 being varied based on how the particular email task is progressing, and FIG. 4(*b*) illustrates a section 57 indicating the task progress state information including the number of completed tasks with respect to the total number of tasks. The shape of the icon may also variably change to indicate the progress state information.

Further, FIG. 4(*c*) illustrates a percentage value bar graph being displayed in the section 57 in which the percentage value indicates a percentage of the selected mail message task. FIG. 4(*d*) shows a background color within a circle being gradually filled according to how the respective task is progressing. The progressing state information thus can be displayed in a variety of methods. Further, the task menu, task list and progress information may be displayed together as shown in FIG. 4, or may be displayed on separate display portions on the terminal. Alternatively, the task menu may be linked to the task list such that the task menu and task list are always displayed simultaneously together.

Figure 5A:
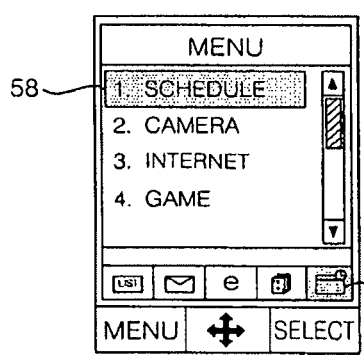
FIGS. 5(a)-5(c) are overviews illustrating displayed task menus and task lists according to the first embodiment.
Figure 5B:
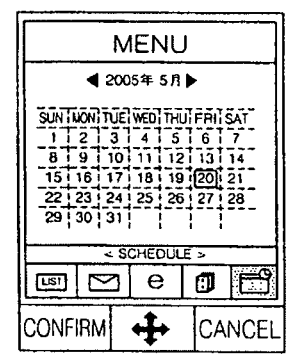
Figure 5C:
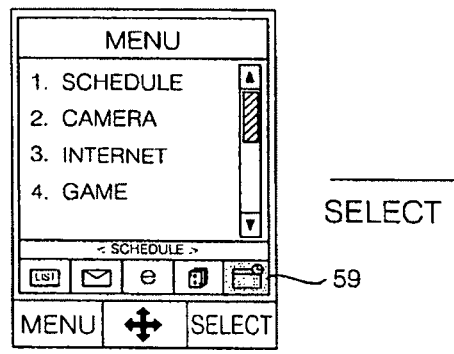

Turning next to FIG. 5, which illustrates a schedule task being selected from the task menu or task list, and then the appropriate menu for the schedule task being executed. That is, when the task "SCHEDULE" 58 is selected from the menu task 40 (see FIG. 5(*a*))or the schedule icon 59 is selected from the task list 50 (see FIG. 5(*b*)), an activation window of the menu "SCHEDULE" is displayed on the output unit 30, as shown in FIG. 5(c). Thus, the user can then input the appropriate scheduling information.

Next, FIG. 6 illustrates various displays including a currently executing task and progress state information of the currently executing task. In more detail, FIG. 6(a) illustrates a task list 60 including currently executing tasks and progress state information 71 about a task 61 selected from the task list 60. The task list 60 is displayed on the upper part of the screen and the progress state information is displayed on the lower part of the screen.

Figure 6A:
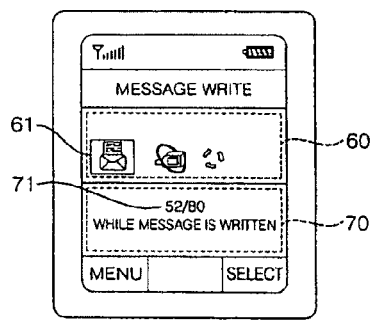
FIGS. 6(a)-6(e) are overviews illustrating displayed task menus and task lists according to a second embodiment of the present invention.
Figure 6B:
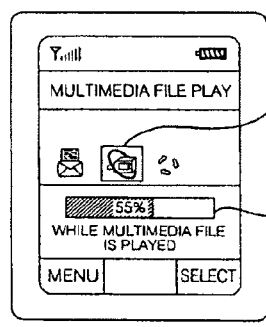
Figure 6C:
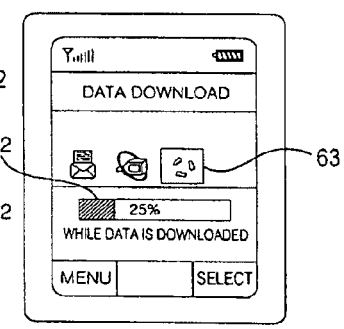

FIG. 6(b) shows an example in which the progress state information 72 is displayed when a multimedia file play item 62 is selected from the task list 60. FIG. 6 (c) shows an example in which the progress state information 72 is displayed when a data download item 63 is selected from the task list 60. Further, the user can scroll through the task list 70 using the left and right move buttons to select different currently executing tasks. Thus, the progress state information for the selected task can be displayed together with the list of currently executing tasks.

Figure 6D:
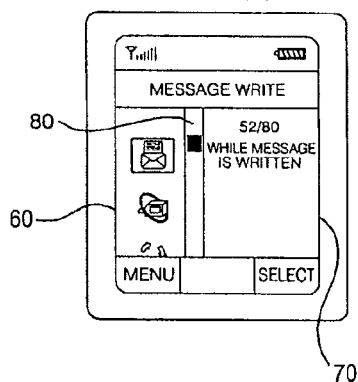
Figure 6E:
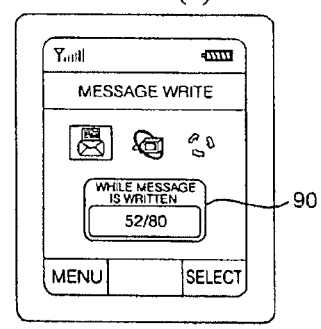

In addition, FIG. 6(d) shows an example in which the task list 60 and progress state information 70 are displayed on left and right sides of the screen. Further, a scroll bar 80 may be used to scroll through the task list 60. Also, FIG. 6(e) shows an example in which a task list is displayed and the progress state information is displayed as a pop-up window 90. In one example, the pop-up window 90 is displayed transparently. Also, the features shown in FIG. 6 can be activated independently from the features shown in FIGS. 2-5. That is, the information shown in FIG. 6 can be displayed by selecting a progress state information key or menu option, for example.

Figure 7:
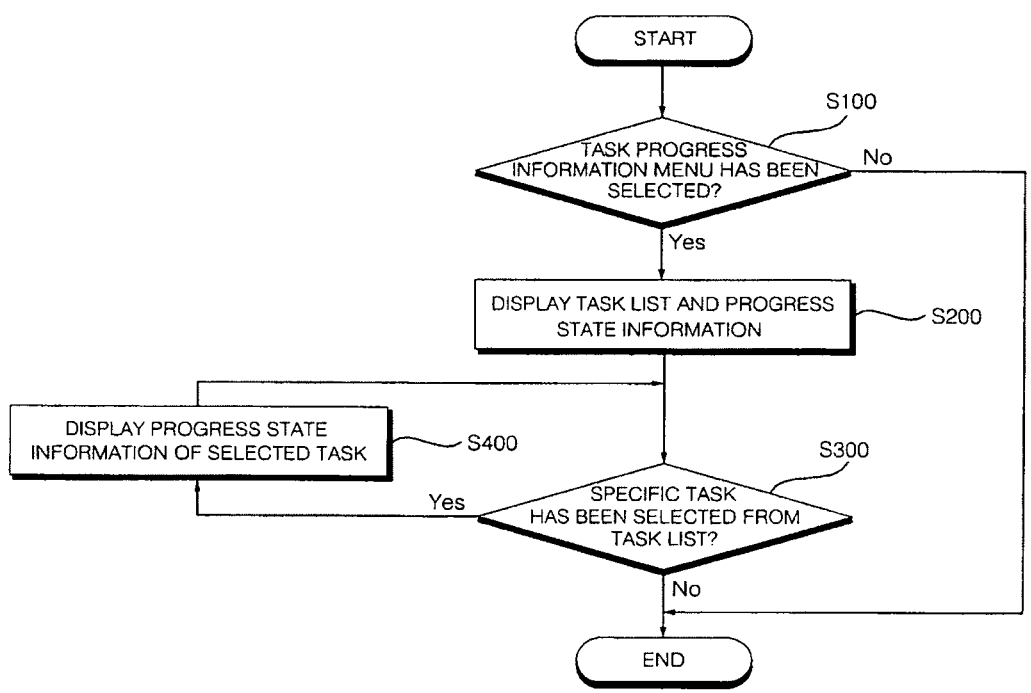
FIG. 7 is a flowchart illustrating a method of controlling a mobile communication terminal according to the present invention.

Turning now to FIG. 7, which is a flowchart illustrating a method of controlling a mobile communication terminal according to an embodiment of the present invention. As shown, the mobile terminal determines whether a task progress information menu has been selected (S100). If the task progress menu has not been selected (No in S100), the method ends. Otherwise, if the task progress menu has been selected (Yes in S100), the method displays both the task list and progress information for the executing tasks (S200).

Then, the method determines if a particular task among the tasks displayed in the task list is selected (S300). If a task has been selected (Yes in S300), the progress information for that particular task is displayed (S400). Thereafter, if another task is selected from the task list, the progress information for the other task is updated and is then displayed. If a particular task has not been selected (No in S300), the method ends.

In addition, FIGS. 2-5 illustrate displaying the task menu in a vertical direction and the task list in a horizontal direction. However, the task menu or task list may also be displayed in other directions such as an arc-shaped or circle-shaped direction. Also, the present invention is also applicable to displaying other information such as email addresses, recipient names, etc. in different directions on the display of the terminal.

Further, as mentioned above, the present invention provides a novel item selecting method in a mobile terminal. That is, the method displays both a first list such as a task menu or other list and second list such as a task list or other list. In addition, the first list is displayed in a first direction and the second list is displayed in a second direction different than the first direction. The directions may be vertical, horizontal, circular, arc-shaped, etc. Further, the first list and the second list are independent of each other. Thus, the user can select an item from the first list and/or the second list.

In addition, the user can move to the first list by pressing a first direction key or jog key, and move into the second list by pressing a second direction key or jog key. The first list can be a service list and the second list can be an object list. For example, the service list can be a list of call or messages such as voice calls, video calls, e-mails, text messages (SMS messages), multimedia messages (MMS), instant messages, etc. The object list can be receiver list such as a phonebook list. The service list may also include multimedia services such as viewing or playing an image or video, setting a background image, setting an incoming ring tone, etc. The object list may also include multimedia objects such as photo images, Mpeg music files, video clips, etc. The first and second lists may also be activated/deactivated by selecting the first and second direction keys or jog keys, respectively.

As described above, the user can view all currently executing task and their progress state information without changing through a variety of different menus. Thus, an unnecessary allocation and release of resources can be reduced.

In addition, the displayed information may be displayed on a touch screen such that a user merely need touch with his or her finger an item/icon to activate the particular items. Alternatively, a key pad may be used where the user presses a key to activate a particular item.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A mobile communication terminal, comprising:
   a display unit; and
   a controller configured to:
   display on the display unit a task list in a horizontal direction including more than one scrollable application icons respectively corresponding to more than one application with program functions that have been executed, and corresponding more than one scrollable progress state information indicating a progress state of the program functions that are executing, and
   in response to a user input indicating a scroll of the task list in a left direction or a right direction, horizontally scroll through the application icons listed in the task list and the corresponding progress state information while displaying the application icons together and vertically adjacent to the corresponding progress state information in a same display screen so as to display other application icons and corresponding progress state information,
   wherein the corresponding progress state information indicates a real-time execution status of the corresponding executing program function and is displayed in the same display screen, and
   wherein the corresponding progress state information is displayed in a window larger than the vertically adjacent application icon in the same display screen.

2. The mobile communication terminal of claim 1, wherein the task list includes a scroll bar configured to scroll through the more than one scrollable application icons listed in the task list.

3. The mobile communication terminal of claim 1, wherein the more than one scrollable corresponding progress state information is displayed as a bar graph, a percentage, or a shape being gradually filled or changed as the corresponding executing program function progresses.

4. The mobile communication terminal of claim 1, wherein the task list includes only program functions that can be simultaneously executed.

5. The mobile communication terminal of claim 1, wherein the more than one scrollable corresponding progress state information includes start information indicating a starting time of the corresponding executing program function and a current updated time indicating where the currently executing program function is with respect to the start time.

6. The mobile communication terminal of claim 1, wherein the window in the same display screen includes progress state information only for the corresponding executed task.

7. The mobile communication terminal of claim 1, wherein the more than one scrollable corresponding progress state information corresponds to a video or audio application currently executing.

8. The mobile communication terminal of claim 1, wherein the more than one scrollable corresponding progress state information includes at least one of a type of the corresponding executing program function and a percentage or ratio of how much of the corresponding executing program function has been completed.

9. The mobile communication terminal of claim 1, wherein the controller is further configured to display a name of a selected application icon in the task list.

10. The mobile communication terminal of claim 1, wherein a blank space is between the corresponding application icon and progress state information.

11. A method of controlling a mobile terminal, the method comprising:
displaying, on a display unit of the mobile terminal, a task list in a horizontal direction including more than one scrollable application icons respectively corresponding to more than one application with program functions that have been executed, and corresponding more than one scrollable progress state information indicating a progress state of the program functions that are executing; and
in response to a user input indicating a scroll of the task list in a left direction or a right direction, horizontally scrolling through the application icons listed in the task list and the corresponding progress state information while displaying the application icons together and vertically adjacent to the corresponding progress state information in a same display screen so as to display other application icons and corresponding progress state information,
wherein the corresponding progress state information indicates a real-time execution status of the corresponding executing program function and is displayed in the same display screen, and
wherein the corresponding progress state information is displayed in a window larger than the vertically adjacent application icon in the same display screen.

12. The method of claim 11, wherein the task list includes a scroll bar configured to scroll though the more than one scrollable application icons listed in the task list.

13. The method of claim 11, wherein the displaying step displays the more than one scrollable corresponding progress state information as a bar graph, a percentage, or a shape being gradually filled as the corresponding task progresses.

14. The method of claim 11, wherein the task list includes only program functions that can be simultaneously executed.

15. The method of claim 11, wherein the more than one scrollable corresponding progress state information includes start information indicating a starting time of the corresponding executing program function a current updated time indicating where the currently executing program function is with respect to the start time.

16. The method of claim 11, wherein the window in the same display screen includes progress state information only for the corresponding executed task.

17. The method of claim 11, wherein the progress state information corresponds to a video or audio application currently executing.

18. The method of claim 11, wherein the more than one scrollable corresponding progress state information includes at least one of a type of a executing program function and a percentage or ratio of how much of the executing program function been completed.

19. The method of claim 11, further comprising:
displaying a name of a selected application icon in the task list.

20. The method of claim 11, wherein a blank space is between the corresponding application icon and progress state information.

* * * * *